(12) United States Patent
Grois et al.

(10) Patent No.: US 6,381,396 B1
(45) Date of Patent: Apr. 30, 2002

(54) OPTICAL INTERCONNECTION APPARATUS

(75) Inventors: Igor Grois, Northbrook; Thomas R. Marrapode, Naperville; Maurice X. Sun, Westmont; Seymon Tkach, Skokie, all of IL (US)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 09/457,027

(22) Filed: Dec. 8, 1999

(51) Int. Cl.$^7$ ................................................. G02B 6/00
(52) U.S. Cl. .......................................... 385/137; 385/15
(58) Field of Search ............................. 385/49, 54, 55, 385/56, 60, 66, 76–78, 92, 134–137, 139; 174/254, 72 A, 68.3, 69, 70 R

(56) References Cited

U.S. PATENT DOCUMENTS

| | | | | |
|---|---|---|---|---|
| 4,652,081 A | * | 3/1987 | Fatatry ....................... | 350/96.2 |
| 5,204,925 A | * | 4/1993 | Bonanni et al. ............... | 385/89 |
| 5,259,051 A | * | 11/1993 | Burack et al. ................. | 385/76 |
| 5,675,681 A | * | 10/1997 | Chiaretti et al. .............. | 385/59 |
| 5,937,133 A | * | 8/1999 | Moss et al. .................. | 385/137 |

* cited by examiner

*Primary Examiner*—Cassandra Spyrou
*Assistant Examiner*—Alessandro V. Amari

(57) ABSTRACT

An optical fiber interconnection apparatus includes a flat flexible body member having a peripheral edge. A plurality of optical fibers are mounted to the body member so that their ends extend beyond the peripheral edge. The ends of a plurality of the fibers extend to different locations of the edge. A tube member surrounds the ends of at least a selected plurality of the fibers extending beyond said peripheral edge from at least one of said locations.

25 Claims, 3 Drawing Sheets

OPTICAL INTERCONNECTION APPARATUS

FIELD OF THE INVENTION

This invention generally relates to the art of optical fibers and, particularly, to an optical fiber interconnection apparatus.

BACKGROUND OF THE INVENTION

Fiber optics are being used in electronic systems with ever-increasing frequency and intensity, because optical fibers can transmit much greater quantities of information than electrical conductors. In increasing numbers of applications, an optical as well as electrical interconnection is desirable between circuit components. Electrical energy is translated to optical energy which is transmitted by an optical fiber or fibers between electronic components, such as printed wiring or circuit boards. One of the problems with using optical fibers is that they are extremely small and difficult to handle. A typical fiber may be an acrylic coated glass fiber having a total outside diameter of 250 microns. These tiny fibers are fragile and cannot withstand abrupt turns or the like. Consequently, it has become known to bond the fibers to flat flexible substrates to form what is called an optical backplane. The present invention is directed to improvements in optical fiber interconnection apparatus or backplanes to address the problems of handling or manipulating optical fibers in interconnection systems.

One type of optical interconnection apparatus includes a flat flexible body member defined by a peripheral edge. A plurality of optical fibers are mounted to the body member so that their ends extend beyond the peripheral edge, and the ends of a plurality of the fibers extend to different locations of the edge. The fibers are mounted to the body member by a pressure sensitive adhesive. A conformal coating is applied over the body member, adhesive and fibers, and the coating covers the ends of the fibers extending beyond the peripheral edge. The coating of the extending ends of the fibers results in the fibers becoming "ribbonized", with the fibers being maintained in a plane by the coating. One of the problems with ribbonizing the fiber ends is that the fibers cannot adequately bend in the plane of their ribbonization. Another problem is that it is difficult to apply the coating to the fiber ends when they extend beyond the body member a considerable length. The present invention is directed to solving these further problems in optical fiber interconnection apparatus of the character described.

SUMMARY OF THE INVENTION

An object, therefore, of the invention is to provide a new and improved optical fiber interconnection apparatus.

In the exemplary embodiment of the invention, the apparatus includes a flat flexible body member having a peripheral edge. A plurality of optical fibers are mounted to the body member so their ends extend beyond the peripheral edge, and the ends of a plurality of the fibers extend to different locations of the edge. A tube member surrounds the ends of a selected plurality of the fibers extending beyond the peripheral edge from at least one of the different locations.

As disclosed herein, the flat flexible body member includes a projecting portion at least at one location. The selected plurality of fibers are mounted on the projecting portion and the ends of the fibers extend beyond an edge of the projecting portion. In one embodiment, a joining tube section is telescoped over the projecting portion and a proximal end of the tube member. This prevents breakage of the fibers at the edge of the projecting portion. In another embodiment, the proximal end of the tube member is positioned over the projecting portion to not only reinforce the tube member but to prevent breakage of the fibers at the edge of the projecting portion.

In a further embodiment of the invention, the extremities of the ends of the selected plurality of fibers are mounted to a guide member which is used to thread the fibers through the tube member. A joining tube section or a distal end of the tube member is positioned over at least an edge portion of the guide member over which the fibers extend. In still another embodiment of the invention, the tube member is slit lengthwise thereof to allow the selected plurality of fibers to be laid into the tube member.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures in which:

DETAILED DESCRIPTION OF THE PREFERRED EMBODIMENTS

Figure 1:
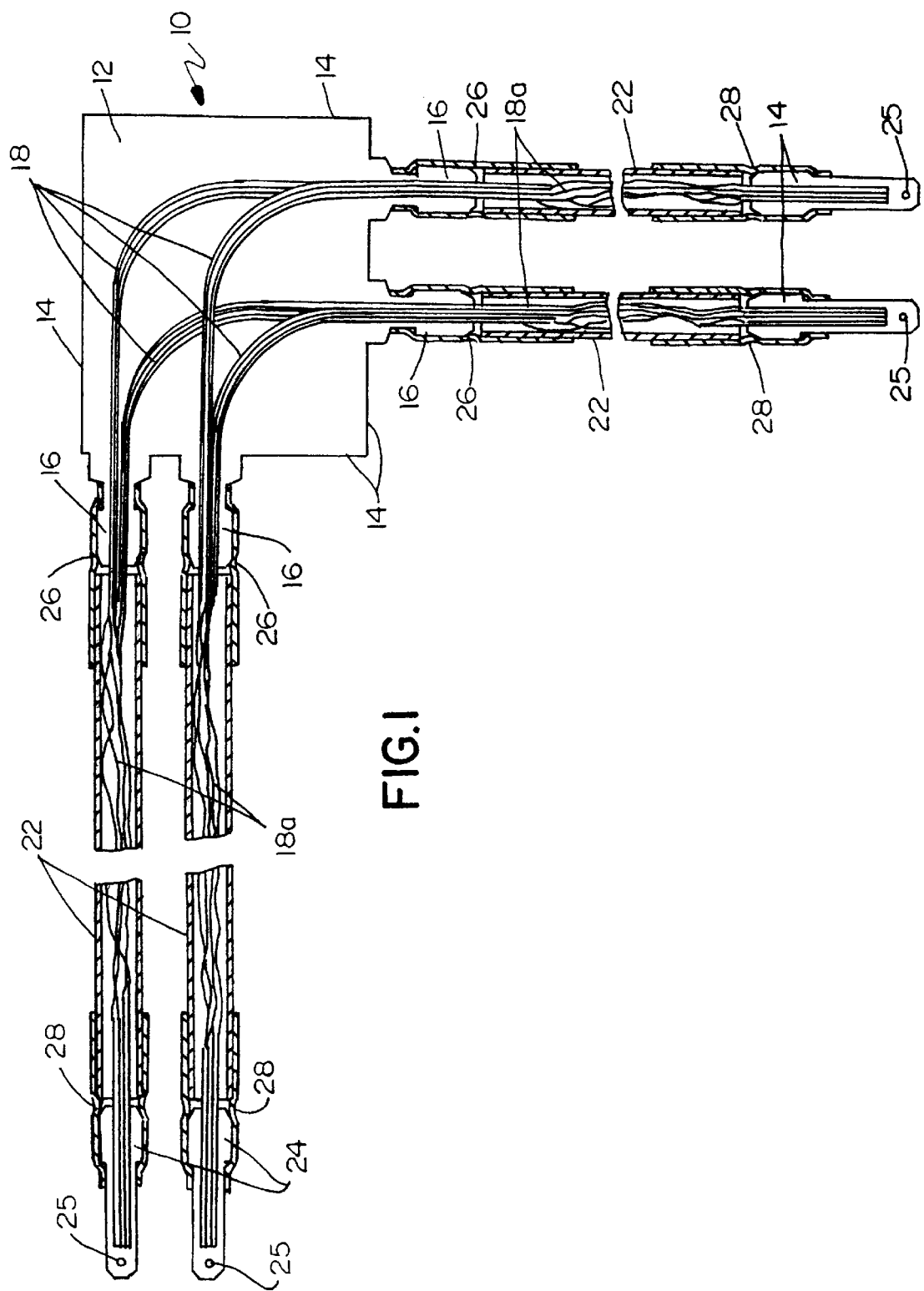
FIG. 1 is a fragmented plan view of one embodiment of the optical fiber interconnection apparatus according to the invention, with the tube members being in section.

Referring to the drawings in greater detail, FIG. 1 shows one embodiment of an optical fiber interconnection apparatus, generally designated 10, embodying the concepts of the invention. The apparatus includes a flat flexible body member 12 having a peripheral edge 14. The body member can be of any geometric configuration, but it is shown in FIG. 1 as being square. The flat flexible body member is a flexible polymer sheet, such as of polyamide material. The body member is coated with a pressure sensitive adhesive, such as an acrylic adhesive typically applied to coated release paper. This adhesive requires the application of some pressure for adhesion and, therefore, is easier to work with than conventional adhesives. The body member includes a plurality of projecting portions 16 at different locations of edge 16 of the body member. The pressure sensitive adhesive covers the projecting portions.

Figure 2:
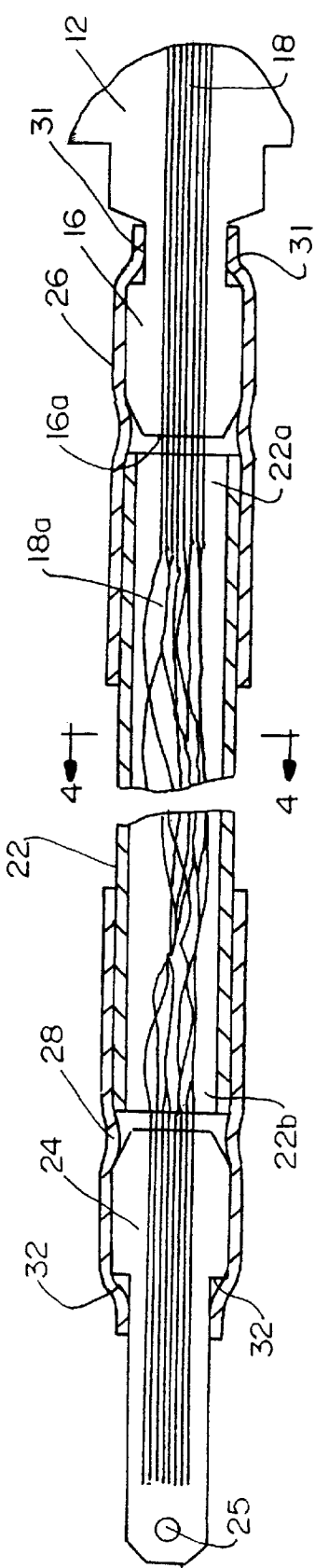
FIG. 2 is a fragmented plan view of a selected plurality of the fiber ends extending beyond the body member of the apparatus, again with the tube member in section.

A plurality of optical fibers 18 are mounted to body member 12 by employing the pressure sensitive adhesive thereon, as described above. The fibers may be routed on the body member in a variety of patterns, but different pluralities of the fibers are routed onto projecting portions 16 to an edge 16a (FIG. 2). Ends 18a of optical fibers 18 extend beyond edges 16a of projections 16. In other words, the ends of the fibers extend to different locations about the peripheral edge 14 of body member 12 as defined by the locations of projecting portions 16.

Figure 3:
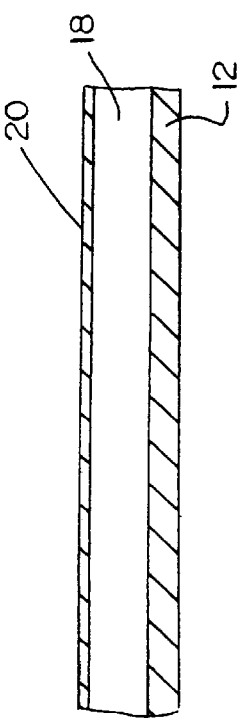
FIG. 3 is an enlarged, fragmented section through the body member area of the apparatus axially of a fiber.

Referring to FIG. 3 in conjunction with FIGS. 1 and 2, a coating 20 may be applied over body member 12, including projecting portions 16, as well as optical fibers 18 mounted on the body member and the projecting portions. The coating is a conformal coating, such as having a silicone resin base. The coating holds fibers 18 down onto the top of body member 12 and projecting portions 16 in a predetermined relationship.

Figure 4:
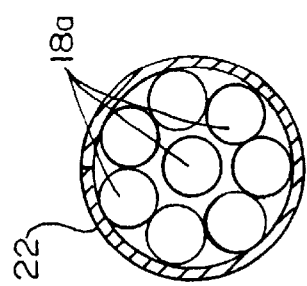
FIG. 4 is an enlarged section taken generally line 4—4 of FIG. 2.

A tube member 22 surrounds each grouping or plurality of optical fiber ends 18a extending beyond each projecting portion 16 of body member 12. As seen in FIGS. 2 and 4, ends 18a of optical fibers 18 are bundled within the respective tube members. By encapsulating the optical fiber ends within the tube members, the ends can be bent omnidirectional versus the single bending direction of prior art "ribbonized" fibers. This greatly enhances the ease of manipulating interconnection apparatus 10 during manufacturing, shipping and actual use. In addition, tube members 22 protect the fibers therewithin.

In one embodiment of the invention, the extremities of each group of optical fiber ends 18a are mounted to a guide member 24 as seen in FIGS. 1 and 2 in the same predetermined relationship as on body member 12 and projecting portions 16. These guide members are used to thread the fibers through tube members 22. Each guide member includes a hole 25 for tying a line to the guide member to thread the guide member through the respective tube member. The ends of the fibers 18a are maintained in a predetermined relationship for easy termination in a ferrule.

FIGS. 1 and 2 also show an embodiment of the invention wherein joining tube members 26 and 28 are used to extend over the ends of tube members 22. As seen best in the enlarged depiction of FIG. 2, joining tube section 26 is telescoped over projecting portion 16 and a proximal end 22a of tube member 22. Joining tube section 28 is telescoped over a distal end 22b of the tube member and at least an edge portion of guide member 24. Joining tube sections 26 and 28 may be provided of a heat shrinkable material so that they securely grasp the ends of the tube members as well as projecting portions 16 of the body member and guide members 24. Both projections 16 and guide members 24 may include recessed portions 31, 32 respectively to accommodate portions of tube sections 26 and 28 for anchoring the tube to projections 16 and guide members 24.

Figure 5:
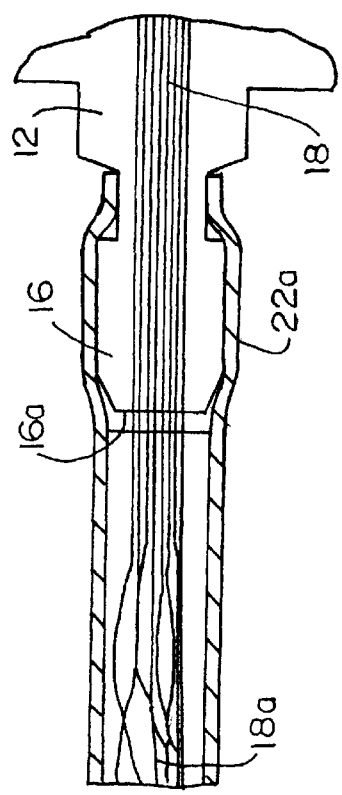
FIG. 5 is a view similar to that of FIG. 2, but showing another embodiment of the invention wherein the joining tube sections are eliminated.

FIG. 5 shows a further embodiment of the invention wherein the joining tube sections 26 and 28 have been eliminated, and the ends of tube member 22 are telescoped directly over projecting portion 16 of the body member and the edge portion of guide member 24. With this embodiment, the tube member may have to be fabricated of a sufficiently pliable material whereas the material of the tube member in the embodiment of FIG. 2 may vary.

Figure 6:
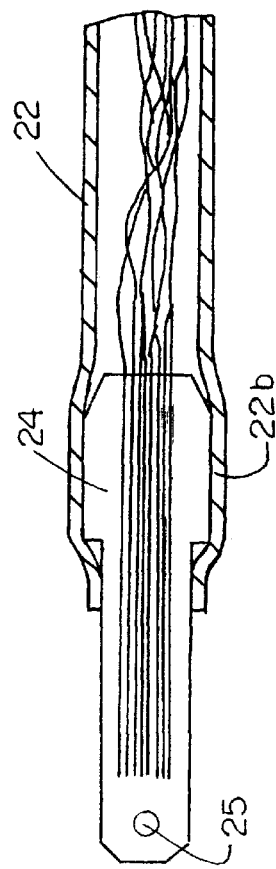
FIG. 6 is a view similar to that of FIG. 4, but showing a further embodiment of the invention wherein the tube member is longitudinally slit.
Figure 6:
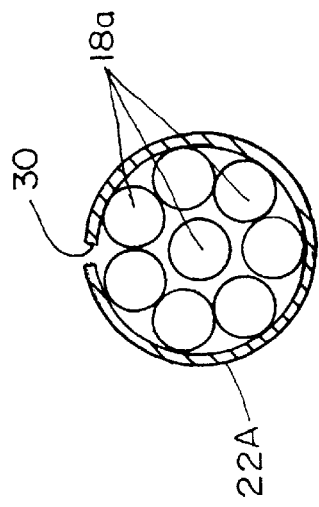

Finally, FIG. 6 shows still another embodiment of the invention wherein a tube member 22A is slit, as at 30, lengthwise thereof. With a slit tube, ends 18a of optical fibers 18 would be laid transversely into the tube member rather than being pulled longitudinally therethrough, i.e., eliminating guide member 24 (FIG. 2). The slit tube may be more appropriate for extremely long fiber ends 18a. A spiral slit along the length of the tube may also be used.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An optical fiber interconnection apparatus, comprising:
   a flat flexible body member having a peripheral edge;
   a plurality of optical fibers mounted to the body member so that their ends extend beyond said peripheral edge and the ends of a plurality of the fibers extend to different locations of the edge; and
   a tube member surrounding the ends of at least a selected plurality of the fibers extending beyond said peripheral edge from at least one of said locations.

2. The optical interconnection apparatus of claim 1 wherein said ends of the plurality of fibers surrounded by the tube member are bundled within the tube member.

3. The optical interconnection apparatus of claim 1 wherein said flat flexible body member includes a projecting portion at said least one location, said selected plurality of fibers being mounted on the projecting portion with the ends of the fibers extending beyond an edge of the projecting portion, and a proximal end of said tube member being positioned over the projecting portion.

4. The optical interconnection apparatus of claim 1 wherein said flat flexible body member includes a projecting portion at said at least one location, said selected plurality of fibers being mounted on the projecting portion with the ends of the fibers extending beyond an edge of the projecting portion, and including a joining tube section telescoped over the projecting portion and a proximal end of said tube member.

5. The optical interconnection apparatus of claim 1 wherein the extremities of the ends of said selected plurality of fibers are mounted to a guide member which is used to thread the fibers through the tube member.

6. The optical interconnection apparatus of claim 5 wherein a distal end of said tube member is positioned over at least an edge portion of said guide member.

7. The optical interconnection apparatus of claim 5, including a jointing tube section telescoped over a distal end of the tube member and at least an edge portion of said guide member.

8. The optical interconnection apparatus of claim 5, wherein said fibers are mounted to the guide member in a predetermined relationship.

9. The optical interconnection apparatus of claim 1 wherein said tube member is slit lengthwise thereof to allow the ends of the selected plurality of fibers to be laid into the slit tube member.

10. The optical interconnection apparatus of claim 9 wherein said slit is a spiral slit.

11. The optical interconnection apparatus of claim 1 wherein said optical fibers are mounted to the body member by a pressure sensitive adhesive.

12. The optical interconnection apparatus of claim 7, including a conformal coating over the body member, adhesive and portions of the fibers mounted on the body member.

13. The optical interconnection apparatus of claim 1 wherein said flat flexible body member comprises a flexible polymer sheet.

14. An optical fiber interconnection apparatus, comprising:
   a flat flexible body member having a peripheral edge and a plurality of projecting portions at different locations of the edge;

a plurality of optical fibers mounted to the body member so that their ends extend beyond said peripheral edge, the ends of a plurality of the fibers extending over and beyond edges of said projecting portions at the different locations of the body member; and a tube member surrounding the ends of each plurality of the fibers extending beyond the edges of each projecting portion of the body member.

15. The optical interconnection apparatus of claim 14 wherein said ends of the plurality of fibers surrounded by each tube member are bundled within the respective tube member.

16. The optical interconnection apparatus of claim 14 wherein a proximal end of each tube member is positioned over the respective projecting portion of the body member.

17. The optical interconnection apparatus of claim 14, including a joining tube section telescoped over each projecting portion and a proximal end of the respective tube member.

18. The optical interconnection apparatus of claim 14 wherein the extremities of the ends of the plurality of fibers extending beyond each projecting portion of the body member are mounted to a guide member which is used to thread the fibers through the respective tube member.

19. The optical interconnection apparatus of claim 18, including a joining tube section telescoped over at least an edge portion of said guide member and a distal end of the respective tube member.

20. The optical interconnection apparatus of claim 12 wherein each of said tube members is slit lengthwise thereof to allow the respective ends of the optical fibers to be laid into the slit tube member.

21. The optical interconnection apparatus of claim 14 wherein said optical fibers are mounted to the body member by a pressure sensitive adhesive.

22. The optical interconnection apparatus of claim 21, including a conformal coating over the body member, adhesive and portions of the fibers mounted on the body member.

23. The optical interconnection apparatus of claim 14 wherein said flat flexible body member comprises a flexible polymer sheet.

24. The optical interconnection apparatus of claim 14, wherein said ends of the fibers extending over said projecting portions are arranged in a predetermined relationship.

25. The optical interconnection apparatus of claim 18, wherein the extremities of the ends of fibers mounted to a guide member are arranged in a predetermined relationship.

* * * * *